United States Patent [19]
Karsh

[11] 3,945,036
[45] Mar. 16, 1976

[54] INFORMATION RECORDING TRANSPORT WITH TAPE TENSION EQUALIZATION BETWEEN DISTINCT CAPSTANS

[75] Inventor: Irving Karsh, Los Angeles, Calif.
[73] Assignee: Bell & Howell Company, Chicago, Ill.
[22] Filed: Aug. 21, 1974
[21] Appl. No.: 499,365

[52] U.S. Cl. .................. 360/71; 226/118; 242/182; 360/90
[51] Int. Cl.² G11B 15/43; G11B 15/29; B65H 17/42; B65H 17/50
[58] Field of Search .................... 360/71, 90, 93–96; 242/182–185; 226/118

[56] References Cited
UNITED STATES PATENTS

| | | | |
|---|---|---|---|
| 3,041,417 | 6/1962 | Stroud et al. .......................... | 360/90 |
| 3,329,364 | 7/1967 | Brettel .............................. | 242/182 |
| 3,393,277 | 7/1968 | Nettleton et al. ..................... | 360/90 |
| 3,507,432 | 4/1970 | Fecher et al. ........................ | 242/182 |
| 3,727,859 | 4/1973 | Dobransky et al. .................. | 242/182 |

*Primary Examiner*—Robert S. Tupper
*Attorney, Agent, or Firm*—Benoit Law Corporation

[57] ABSTRACT

An information recording tape transport comprises equipment for selectively winding and unwinding information recording tape, two distinct and spaced tape drive capstans, separate transducing equipment associated with each tape drive capstan, and at least three distinct tension equalizing means located, respectively, between the two capstans, to one side of one of the capstans and to one side of the other of the capstans.

24 Claims, 5 Drawing Figures

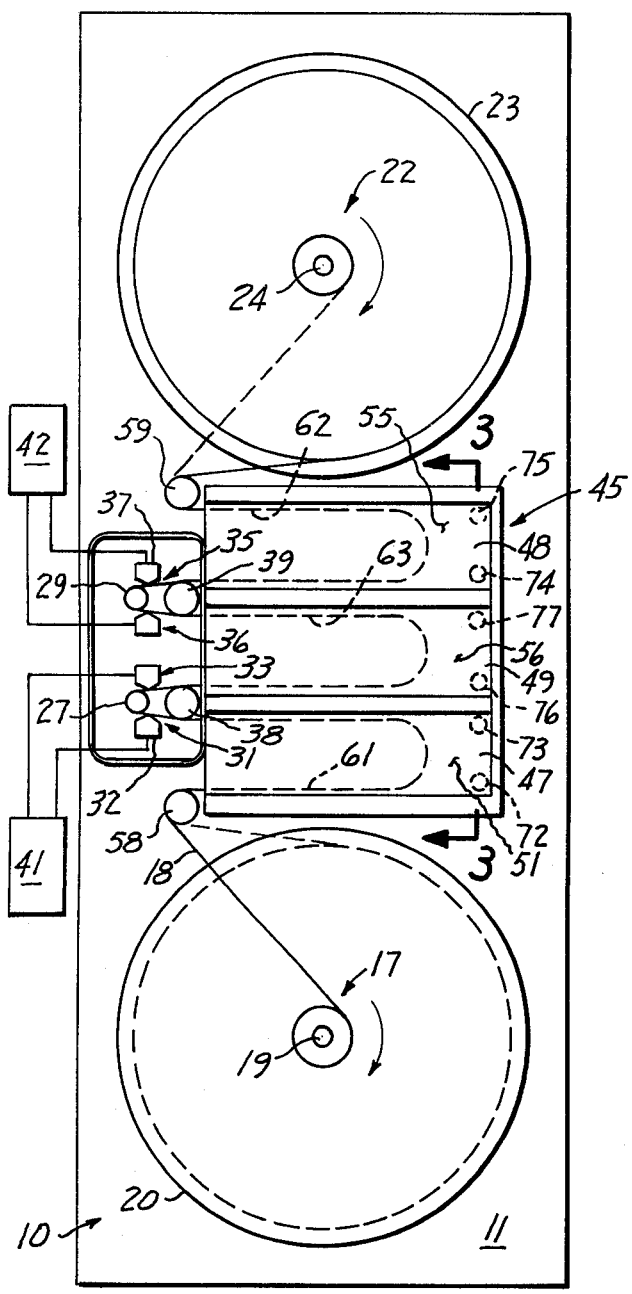
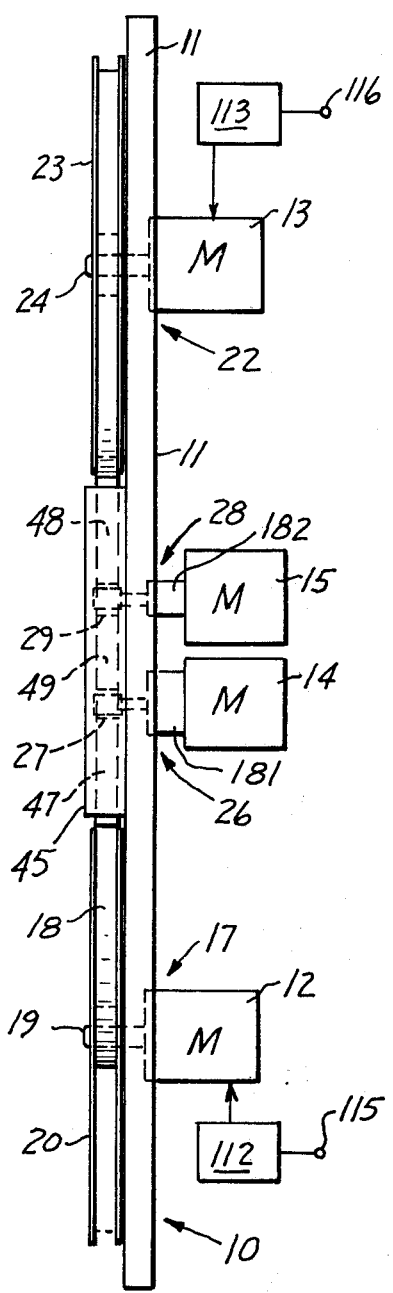
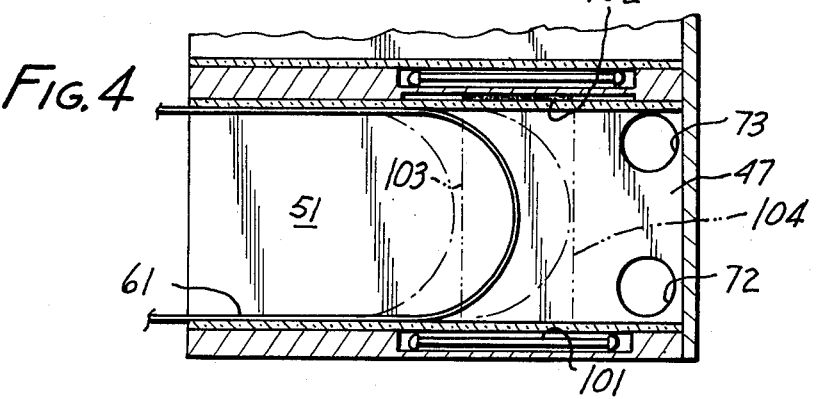

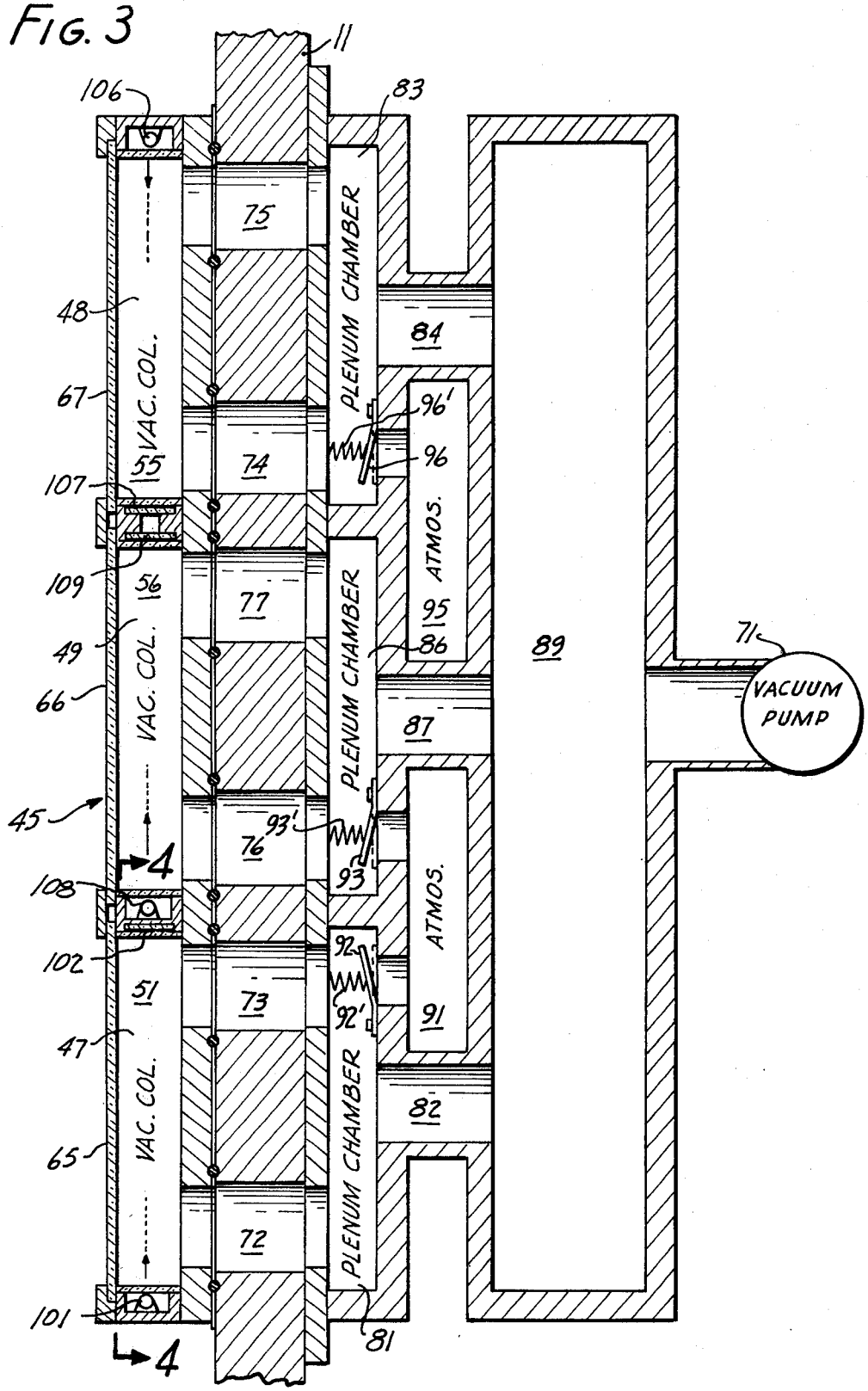

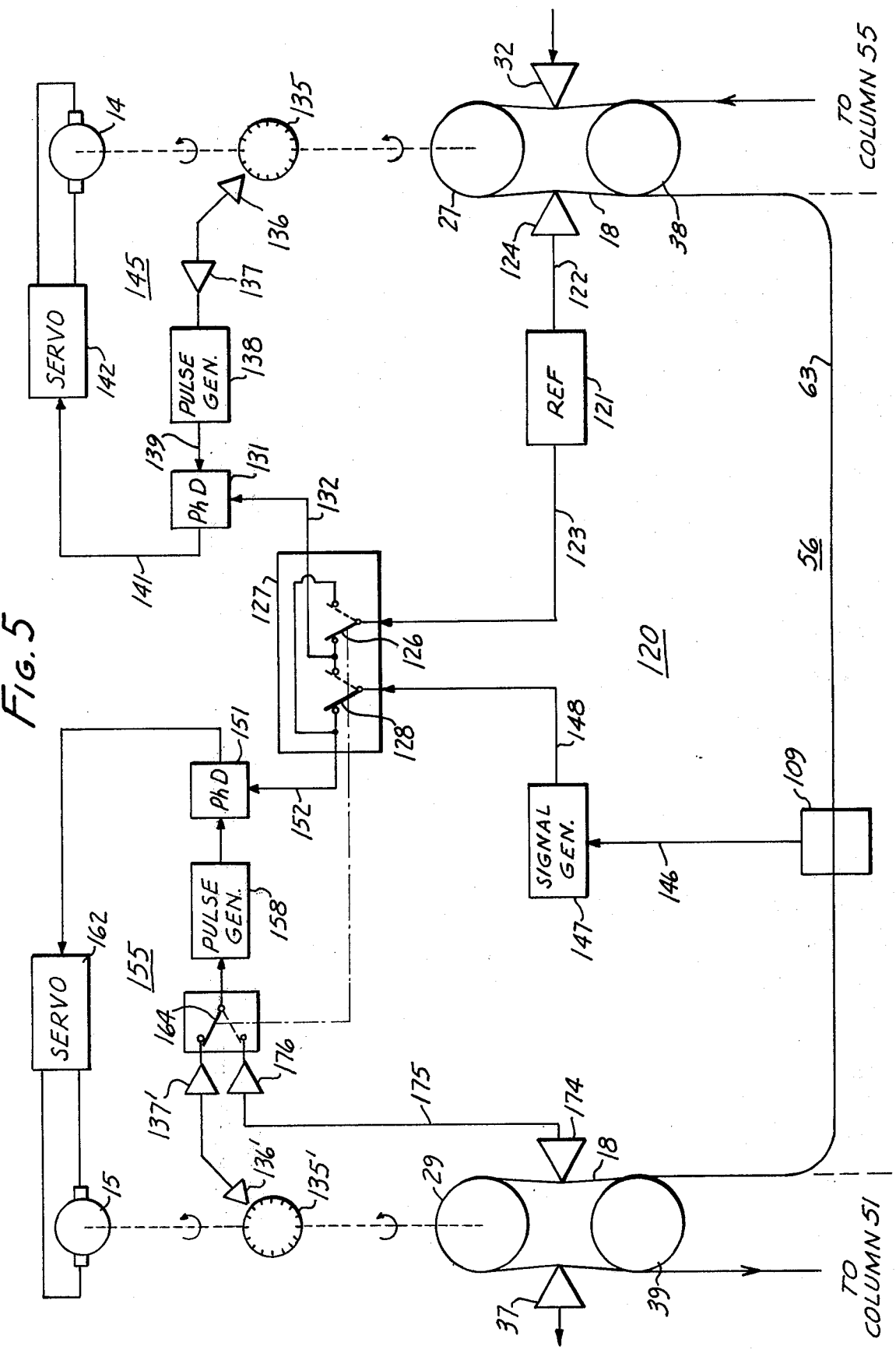

INFORMATION RECORDING TRANSPORT WITH TAPE TENSION EQUALIZATION BETWEEN DISTINCT CAPSTANS

BACKGROUND OF THE INVENTION

1. Field of the Invention

The subject invention relates to information recording equipment and, more particularly, to information recording tape transports, such as magnetic recording tape transports.

2. Description of the Prior Art

The phrase "information recording tape transport" broadly refers to equipment for transporting an information carrier having the form of a tape, such as, but not necessarily limited to, magnetic recording tape.

Existing information recording tape transports typically suffer from the drawback of having the same tape drive capstan serve both the record head and its corresponding reproduce head. This militates against the accomplishment of identical geometry between each record head and its corresponding reproduce head.

Prior proposals which employed more than one tape drive capstan were not adapted to the use of selective tape winding and unwinding equipment and lacked an adequate tape equalization between the tape drive capstans.

SUMMARY OF THE INVENTION

It is a general object of this invention to overcome the above mentioned disadvantages.

It is a related object of this invention to provide improved information recording tape transports.

It is also an object of this invention to provide improved information recording tape transports having first winding means for selectively winding and unwinding information recording tape and second winding means spaced from the first winding means for selectively winding and unwinding information recording tape and having two tape drive capstans located between the first and second tape winding means.

It is a related object of this invention to provide information recording tape transports of the latter type having improved tension equalizing means for applying recording tape to separate transducer means at the tape drive capstans at controlled tension.

It is a further object of this invention to provide information recording tape transports of the type herein mentioned including improved equipment for controlling the lengths of recording tape ahead of, between and behind the tape drive capstans.

It is a related object of this invention to provide information recording tape transports of the type herein described employing at least three tape vacuum columns in a novel combination.

Other objects will become apparent in the further course of this disclosure.

From a first aspect thereof, the subject invention resides in an information recording tape transport comprising in combination first winding means for selectively winding and unwinding information recording tape, second winding means spaced from said first winding means for selectively winding and unwinding information recording tape, first driving means including a first tape drive capstan for driving information recording tape between said first and second winding means, second driving means distinct from said first driving means and including a second tape drive capstan for driving information recording tape between said first and second winding means, first transducer means located adjacent said first tape drive capstan for transducing information relative to information recording tape, second transducer means located adjacent said second tape drive capstan for transducing information relative to information recording tape, and means for applying recording tape to said first and second transducer means at controlled tension, comprising first tension equalizing means between said first winding means and said first tape drive capstan, second tension equalizing means between said second winding means and said second tape drive capstan, and third tension equalizing means between said first and second tape drive capstans.

From another aspect thereof, the invention resides in an information recording tape transport comprising in combination first winding means for selectively winding and unwinding information recording tape, second winding means for selectively winding and unwinding information recording tape, first driving means including a first tape drive capstan for driving information recording tape between said first and second winding means, second driving means including a second tape drive capstan for driving information recording tape between said first and second winding means, first transducer means located adjacent said first tape drive capstan for transducing information relative to information recording tape, second transducer means located adjacent said second tape drive capstan for transducing information relative to information recording tape, a first tape pressure differential column between said first winding means and said first tape drive capstan, a second tape pressure differential column between said second winding means and said second tape drive capstan, a third tape pressure differential column between said first and second tape drive capstans, and means for controlling the lengths of recording tape in said first, second and third tape pressure differential columns.

The expression "tape pressure differential column" as herein employed is intended to cover both vacuum columns in which tape loops are formed and pressurized columns wherein air or another gaseous fluid is applied to a tape to provide a tape loop.

From yet another aspect thereof, the invention resides in an information recording tape transport comprising, in combination, first winding means for selectively winding and unwinding information recording tape, second winding means spaced from said first winding means for selectively winding and unwinding information recording tape, first driving means including a first tape drive capstan for driving information recording tape between said first and second winding means, second driving means distinct from said first driving means and including a second tape drive capstan for driving information recording tape between said first and second winding means, first transducer means located adjacent said first tape drive capstan for transducing information relative to information recording tape, second transducer means located adjacent said second tape drive capstan for transducing information relative to information recording tape, and means for applying recording tape to said first and second transducer means at controlled tension, comprising first means for equalizing tension of information recording tape to one side of said first driving means, second means for equalizing tension of information recording tape to one side of said second driving means, third means for equalizing tension of information recording tape to the other sides of said first and second driving means, means operatively associated with said first, second and third tension equalizing means for jointly energizing said first, second and third tension equalizing means, first isolating means operatively associated with said first tension equalizing means and said joint energizing means for isolating the equalizing function of said first tension equalizing means from the equalizing function of said second and third tension equalizing means, second isolating means operatively associated with said second tension equalizing means and said joint energizing means for isolating the equalizing function of said second tension equalizing means from the equalizing function of said first and third tension equalizing means, and third isolating means operatively associated with said third tension equalizing means and said joint energizing means for isolating the equalizing function of said third tension equalizing means from the equalizing function of said first and second equalizing means.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is an elevation of a tape transport in accordance with a preferred embodiment of the subject invention;

FIG. 2 is a side view of the tape transport of FIG. 1;

FIG. 3 is a detail view, on an enlarged scale, taken on the line 3 — 3 in FIG. 1;

FIG. 4 is a further detail view taken on the line 4 — 4 in FIG. 3; and

FIG. 5 is a block diagram of equipment in accordance with a preferred embodiment of the subject invention for operating the tape transport shown in FIGS. 1 to 4.

DESCRIPTION OF PREFERRED EMBODIMENTS

The tape transport 10 shown in the drawings has a baseplate 10 mounting motors 12, 13, 14 and 15.

The motor 12 is part of first winding equipment 17 for selectively winding and unwinding information recording tape 18. The first winding equipment also includes a drive shaft 19 driven by the motor 12 and constructed in a conventional manner (not shown) for receiving a tape reel 20.

Similarly, the motor 13 is part of a second winding means 22 spaced from the first winding means for selectively winding and unwinding information recording tape on a tape reel 23 which is received on a shaft 24 driven by the motor 13.

The motor 14 is part of first driving equipment 26 including a first tape drive capstan 27 for driving information recording tape between the first and second winding equipment 17 and 22. Similarly, the motor 15 is part of second driving equipment 28 being distinct from the first driving equipment 26 and including a second tape drive capstan 29 for driving information recording tape between the first and second winding equipment 17 and 22.

First transducing equipment 31 is located adjacent the first tape drive capstan 26 for transducing information relative to the information recording tape 18. By way of example, the transducing equipment 31 may include information recording devices, such as magnetic tape recording heads 32 and 33, when the tape 18 is a magnetic recording tape.

Second transducer equipment 35 is located adjacent the second tape drive capstan 29 for transducing information relative to the information recording tape 118. By way of example, the second transducer equipment 35 may include information playback or reproducing devices, such as magnetic reproducing heads 36 and 37 when the tape 18 is a magnetic recording tape.

Circular tape guides 38 and 39 are located adjacent the capstans 27 and 28, respectively, in order to reduce the effects of an unsupported tape loop adjacent the tape drive capstans and in order to provide for desired tape guidance. The guides 38 and 39 typically have a low-friction surface and may be provided with a low-friction air film, if desired.

The heads 32, 33, 36 and 37 are mounted as closely as possible to their adjacent capstan, in order to achieve the well-known benefits of a "zero loop" at the record and reproduce heads as closely as possible.

Conventional electronic recording equipment 41 may be connected to the record heads 32 and 33. Conversely, conventional playback or reproduce equipment may be connected to the reproduce heads 35 and 36, as indicated at 42.

The illustrated apparatus further includes equipment 45 for applying recording tape to the transducers 32, 33, 36 and 37 at controlled tension.

In particular, the transport 10 includes a first tension equalizer 47 between the first winding equipment 17 or tape reel 20 and the first tape drive capstan 27. Similarly, a second tension equalizer 48 is located between the second winding equipment 22 or tape reel 23 and the second tape drive capstan 29. Further in accordance with the subject invention, a third tension equalizer 49 is located between the first and second tape drive capstans 27 and 29.

In the illustrated preferred embodiment, the first tension equalizer 47 comprises a tape vacuum column 51 located between the first tape winding equipment 17 and the first tape drive capstan 27. Similarly, the tape tension equalizer 48 comprises a tape vacuum column 55 located between the second tape winding means 22 and the second tape drive capstan 29. The third tape tension equalizer 49 comprises a tape vacuum column 56 located between the tape drive capstans 27 and 29. A circular tape guide 58 cooperates with the previously mentioned tape guide 38 in aiding the formation of a tape loop 61 in the first vacuum column. Similarly, a circular tape guide 59 cooperates with the previously mentioned tape guide 39 in aiding the formation of a tape loop 62 in the vacuum column 55. The tape guides 38 and 39, in turn, aid the formation of a tape loop 63 in the third vacuum column 56.

The vacuum columns 51, 55 and 56 have transparent covers 65, 66 and 67. A vacuum pump establishes the requisite vacuum for the columns 51, 55 and 56. In particular, the vacuum pump 71 evacuates air out of the vacuum columns 51, 55 and 56 through ports 72 and 73, 74 and 75, and 76 and 77, respectively. The ports 72 and 73 are evacuated through a plenum chamber 81 and a common port 82. The ports 74 and 75 are evacuated through a plenum chamber 83 and a common port 84. The ports 76 and 77 are evacuated through a plenum chamber 86 and a common port 87.

The ports 82, 84 and 87, in turn, are evacuated through a main air duct 89 connected to the vacuum pump 71. Upon decrease of pressure in the vacuum columns 51 and 56 (increase of the vacuum or pressure differential) air is individually admitted to the plenum chambers 81 and 86 from an air space 91 via valves 92 and 93. Similarly, air is admitted to the plenum chamber 83 from an air space 95 via a valve 96 upon decrease of pressure in the vacuum column 55.

Each of the vacuum columns 51, 55 and 56 has its own sensing means for sensing a predetermined quality of the tape loop formed therein. In particular, the vacuum column 51 as seen in FIGS. 3 and 4 has an elongate light source 101 and a corresponding photosensor 102 for sensing the length or bight portion of the tape 61 within a range indicated by dotted lines 103 and 104.

Similarly, the vacuum column 55 is equipped with an elongate light source 106 and a corresponding photosensor 107 for sensing the length of the tape loop 62 formed in the vacuum column 55. An elongate light source 108 and corresponding photosensor 109 are provided in the vacuum column 56 to sense the length of the tape loop 63 in that vacuum column.

In accordance with conventional practice, evacuation of air through the ports 72 and 73, 76 and 77, and 74 and 75 causes the formation of the tape loops 61, 62 and 63 in the vacuum columns 51, 55 and 56. In the illustrated preferred embodiment, the first winding equipment 17 is controlled in response to exposure variation of the photosensor 102. Similarly, the second tape winding equipment 22 is controlled in response to exposure variations of the photosensor 107. Conversely, either of the tape drive equipment 26 and 28 is controlled in response to exposure variations of the photosensor 109.

It may also be said that the first winding equipment 17 controls the length of the tape loop 61, while the second winding equipment 22 controls the length of the tape loop 62, and either of the tape driving equipment 26 and 28 controls the length of the tape loop 63.

Equipment for controlling the speed of rotation of reel drive equipment of the type of the motors 12 and 13 in response to output signal of photosensors is well known in the magnetic tape transport art.

Accordingly, these controls, which may be of a phase locked loop servo control type are merely shown in FIG. 2 as blocks 112 and 113 for the reel drive motor 12 and 13, respectively. The motor control 112 has an input 115 for receiving the output signal of the photosensor 102. The motor control 113 has an input 116 for receiving the output signal of the photosensor 107.

By varying the speed of rotation of the tape reel 20 in response to exposure variations of the photosensor 102, the motor control 112 appropriately maintains the bight portion of the tape loop 61 within the limits 103 and 104 shown in FIG. 4. The motor control 113 operates in a conventional manner in response to exposure variations of the photosensor 107 to maintain the tape loop 62 at a desired length.

A servo control of the tape loop 63 in accordance with a preferred embodiment of the subject invention will now be explained with the aid of FIG. 5.

As shown in FIG. 1, and as somewhat diagrammatically indicated in FIG. 5, the tape loop 63 is located in the third or center vacuum column 56. To conserve drawing space, the tape loop 63 has been shown in a somewhat flattened condition in FIG. 5.

Also shown symbolically in FIG. 5 is the photosensor 109 located in the third or center tape vacuum column 56 as shown in FIG. 3 in order to sense the length of the tape loop 63 and to provide the control 120 shown in FIG. 5 with a correspondingly varying electric signal.

The control 120 includes a reference frequency generator 121 which is typically crystal controlled to provide at output leads 122 and 123 a high-precision reference frequency signal. In the record mode, that reference signal is recorded with an auxiliary recording head 124 as a pilot signal on a pilot track of the recording tape 18.

The lead 123 applies the reference frequency signal produced by the generator 121 to a first switch 126 of a double-pole, double-throw switch combination 127 including also a second switch 128 ganged to the switch 126 for simultaneous actuation in the manner of a polarity reversal switch. In practice, the illustrated switch combination 127 is preferably provided by one of its conventional electronic equivalents.

In its solidly illustrated position, the first switch 126 connects the reference frequency signal to an input of a phase detector 131 via the leads 123 and 132.

At the same time, a tachometer 135, coupled to the first capstan drive motor 14 rotates in synchronism with the first tape drive capstan 27. A pickup 136, which may be of a photoelectric or magnetic type, provides a playback amplifier 137 with a first tachometer signal varying in proportion to the velocity of the first tape drive capstan 27.

Suitable conventional equipment 138 converts the amplified tachometer signal into a signal which the phase comparator 131 is capable of comparing with the signal received via the lead 132. Various conventional apparatus are suitable for the part 138. By way of well-known example, the component 138 may include a zero crossing detector which detects the zero crossings in the amplified tachometer signals and a pulse generator which generates pulses the leading edge of which corresponds to the detected zero crossings. A lead 139 applies these generated pulses as a speed varying signal to a second input of the phase detector 131 for comparison with the fixed reference signal provided by the reference generator 121.

The resulting error signal is applied by a lead 141 to an input of a servo amplifier system 142 which varies the energization of the first capstan drive motor 14. By way of example, the capstan drive motor 14 may be of a direct-current type and the component 142 may include a conventional direct-current servo amplifier for controlling the speed of the motor 14. Loop filters and other conventional components customarily employed in servo systems of the illustrated type may also be included in the servo equipment 142. It will be recognized that the components 135, 136, 137, 138, 131 and 142 form part of a phase lock servo loop 145 for controlling the speed of the tape drive capstan 27 on the basis of the reference frequency provided by the reference generator 121, as long as the control 120 is in a record mode in which signals may be recorded by the previously disclosed recording head 32 and, if desired, also by the above mentioned recording head 33 on the recording tape 18 (see FIG. 1).

In the preferred embodiment illustrated in FIG. 5, the record mode exists when the ganged switches 126 and 128 are in their solidly illustrated position. In that solidly illustrated position, the switch 128 effects control of the length of the recording tape loop 63 in the third or center column 56 in response to the output signal of the photosensor 109.

To this effect, a lead 146 applies the output signal of the photosensor 109 to a signal generator 47 which generates in an output lead 148 a signal which is similar to the signal generated by the reference generator 121 but which has a frequency that varies as a function of the exposure of the photosensor 109. In other words, the signal generated at 147 and applied to the lead 148 varies as a function of the length of the tape loop 63 in the third or center vacuum column 56. Signal generators of the type of generator 147 are well known in the art and may, for example, include a voltage controlled oscillator that provides a frequency varying output signal in response to a voltage varying input signal generated by the photosensor 109.

The switch 128, in its solidly illustrated position, supplies the frequency varying signal provided by the signal generator 147 via a lead 152 to an input of a phase detector 151. This phase detector is part of a phase lock servo loop 155 which controls the velocity of the second tape drive capstan 29 by varying the energization of the second drive motor 15 which may also be a direct-current motor as the first tape drive motor 14.

To this effect, the servo loop 155 comprises the mentioned phase detector 151, which corresponds to the phase detector 131 of the servo loop 145, a tachometer 135' which corresponds to tachometer 135 of the servo loop 145 but which is coupled to the second drive motor 15 for providing a signal varying as a function of velocity variations of the second tape drive capstan 29, a tachometer pickup 136' which corresponds to the tachometer pickup 136 of the servo loop 145, a playback amplifier 137' which corresponds to the playback amplifier 137 of the servo loop 145, a pulse generator 158 which corresponds to the pulse generator 138 of the servo loop 145, and a servo amplifier system 162 which corresponds to the servo amplifier system 142 of the servo loop 145 and which controls the energization of the second tape drive motor 15 so as to phase lock the velocity of the capstan 29 and thereby the speed of the tape 18 in the region of the second tape drive capstan 29 to the signal generated by the photosensor 109.

It will be noted in this respect that the servo loop 155 includes a single-pole, double-throw switch 164 or a conventional electronic equivalent thereof, which is ganged with the switches 126 and 128 of the double-pole, double-throw switch combination 127. In the record mode of the control 120, the switch 164 is in its solidly illustrated position, as are the switches 126 and 128. Accordingly, the servo loop 155 phase locks the velocity of the second tape drive capstan 29 to the signal generated by the photosensor 108. In this manner, the second tape drive 17, acting through the second tape drive capstan 29, controls or adjusts the length of the tape loop 63 in the third or center vacuum column 56 in the second mode of the illustrated equipment.

In the reproduce mode of the illustrated control 120, the switches 126, 128 and 164 are in their second positions, illustrated by dotted lines in FIG. 5. In that position, the switch 128 applies the output signal of the signal generator 147 via the leads 148 and 132 to the lower input of the phase detector 131. In that manner, the servo loop 145 will cause the first tape drive motor 14 to control or adjust the length of the tape loop 63 in the third or center vacuum column 56 by appropriate speed variation of the first tape drive capstan 27.

In the record mode, the switch 164, in its solidly illustrated position, tach locks the servo loop 155 by applying signals from the tach 135' to that loop. In the reproduce mode, the switch 164, in its second position indicated by a dotted line, tape locks the loop 155 by applying the pilot signal reproduced by the head 174 to the servo loop 155.

It will thus be recognized that the tape loop 63 in the third or center vacuum column 56 is servoed to the first tape drive 14 and first capstan 27 in the reproduce mode of the equipment, and is conversely servoed to the second tape drive 15 and second capstan 29 in the record mode of the illustrated equipment. In this manner, the control or adjustment of the central tape loop 63 is properly and conveniently taken care of in either mode of operation.

In its second position, illustrated by dotted lines, the switch 126 connects the reference frequency signal generated by the high-precision reference signal generator 121 via leads 123 and 152 to the lower input of the phase detector 151. In this manner, the second tape drive 15 is servoed to the high-precision reference frequency. Simultaneously, an auxiliary reproduce head 174 reproduces, from the pilot track on the tape 18, the pilot signal which, as mentioned above, has been recorded on the tape by the above mentioned auxiliary recording head 124. The reproduced pilot signal is applied to the switch 164 via a lead 175 and a playback amplifier 176. In its second or reproduce position, illustrated in FIG. 5 by dotted lines, the switch 164 applies the reproduced and amplified pilot signal to the pulse generator 158 which accordingly energizes the second input of the phase detector 151. In other words, the phase detector 151, in the reproduce mode of the equipment, compares the pilot signal reproduced from the tape 18 with the reference signal produced by the stable reference signal generator 121.

In this manner, the servo loop 155 varies the energization of the second tape drive motor 15 in the sense of rapid flutter and wow correction.

The subject invention lends itself ideally to an optimization of bandwidth considerations and flutter and wow correction. In particular, the separated record and reproduce capstan functions permit the record capstan to be associated with high inertia in the interest of minimum flutter and similar disturbances during the recording process.

On the other hand, the reproduce capstan 29 may be associated with a considerably lower inertia in the interest of a rapid correction of flutter and similar disturbances. This has been indicated in FIG. 2 by showing at 14 a relatively large block 181 symbolizing a relatively large flywheel coupled to the first tape drive capstan 27. On the other hand, a relatively small block 182 symbolizing a small inertia associated with the second tape drive capstan 29 has been shown in FIG. 2.

In addition, the illustrated vacuum columns 51, 55 and 56 or their equivalent parts ideally serve as means for maintaining tape tension at the first and second transducer equipment 31 and 35 at essentially constant levels.

Further due to the features of the subject invention, identical geometry between each record head and its corresponding reproduce head is realizable. Moreover, basically conventional interlace head techniques may advantageously be employed to realize a pseudo zero loop between corresponding record and reproduce heads.

In this manner, a reproduce head, such as the head 37 shown in FIG. 5, may be employed to reproduce, in the record mode of the equipment, signals which have been recorded on the tape 18 by a corresponding recording head at the capstan 27. Due to the provision of the third or center vacuum column 56, and the unique control of the tape loop 63 in accordance with the subject invention, the record and reproduce capstans 27 and 29 are isolated from each other during both record and reproduce modes. In addition, the capstan 27 is isolated from the tape winding equipment 17 by the vacuum column 51, while the capstan 29 is isolated from the second tape winding equipment 22 by the vacuum column 55. Equipment according to the subject invention is thus adapted to the performance of various functions in a highly reliable manner and at a high quality of performance.

Another important feature of an aspect of the subject invention concerns the manner of operation of the tension equalizers 47, 48 and 49. In particular, the vacuum pump 71, operating through the common or main air duct 89, jointly energizes the tension equalizers 47, 48 and 49 by jointly evacuating the tape vacuum columns 51, 55 and 56.

The ports 72, 73 and 82 constitute restricted cross-section duct means for isolating the function of the tape vacuum column 51 from the functions of the tape vacuum columns 55 and 56. Similarly, ports 76, 77 and 87 constitute restricted cross-section duct means for isolating the function of the tape vacuum column 56 from the functions of the tape vacuum columns 51 and 55. The ports 74, 75 and 84, in turn, constitute restricted cross-section duct means for isolating the function of the tape vacuum column 55 from the functions of tape vacuum columns 51 and 56.

The pressure regulating valves 92, 93 and 96 also have an isolating function. The particularly the valve 92 is biased to a normally closed position, indicated by a dotted line, by a spring 92'. This spring 92' maintains the valve 92 in its closed position so long as the pressure differential at the valve 92 is lower than a desired operating differential. As the pressure differential or, in other words, the vacuum in the column 51, achieves a desired value, the valve is opened by that pressure differential against the bias of the spring and air is admitted to the chamber 81 thereby establishing and maintaining the proper pressure within the vacuum column 51.

The region 91 is connected to atmosphere for this purpose, as is the region 95. Alternatively, the regions 91 and 95 may be connected to a gas supply for the admission of a gas other than air.

A function similar to the valve 92 is individually performed by the valve 93 with bias spring 93' for the vacuum column 56, while the valve 96 with bias spring 96' similarly serves the vacuum column 55.

In this manner, the product of tape area times pressure differential in each vacuum column is maintained constant independently of the functions of the other vacuum columns. In particular, the illustrated preferred embodiment shown in FIG. 3 isolates the individual vacuum column functions from each other.

It will be appreciated that the latter principles disclosed in FIG. 3 with reference to a three vacuum column system may also be employed in connection with two vacuum columns or other equalizing or tape loop systems.

In either case, the result is a largely independent equalizing function among two or more tape loop systems.

Also, while vacuum columns have been shown herein by way of preferred example, other pressure differential columns, such as pressurized columns (wherein air or another gaseous fluid is applied to the tape to form the requisite tape loops), may be employed instead.

The subject extensive disclosure will suggest or render apparent to those skilled in the art various modifications and variations within the spirit and scope of the subject invention.

I claim:

1. An information recording tape transport comprising in combination:
    first winding means for selectively winding and unwinding information recording tape;
    second winding spaced from said first winding means for selectively winding and unwinding information recording tape;
    first driving means including a first tape drive capstan for driving information recording tape between said first and second winding means;
    second driving means distinct from said first driving means and including a second tape drive capstan for driving information recording tape between said first and second winding means;
    first transducer means located adjacent said first tape drive capstan for transducing information relative to information recording tape;
    second transducer means located adjacent said second tape drive capstan for transducing information relative to information recording tape; and
    means for applying recording tape to said first and second transducer means at controlled tension, comprising:
    first tension equalizing means between said first winding means and said first tape drive capstan;
    second tension equalizing means between said second winding means and said second tape drive capstan; and
    third tension equalizing means between said first and second tape drive capstans.

2. An information recording tape transport as claimed in claim 1, wherein:
    said first tension equalizing means include means for controlling said first winding means;
    said second tension equalizing means include means for controlling said second winding means; and
    said third tension equalizing means include means for controlling either of said first and second driving means.

3. An information recording tape transport as claimed in claim 1, wherein:
    said first tension equalizing means include means for forming a first tape loop and first sensing means for sensing a predetermined quality of said first tape loop;
    said second tension equalizing means include means for forming a second tape loop and second sensing means for sensing a predetermined quality of said second tape loop;
    said third tension equalizing means include means for forming a third tape loop and third sensing means for sensing a predetermined quality of said third tape loop;

said first winding means include means connected to said first sensing means for controlling said first tape loop;

said second winding means include means connected to said second sensing means for controlling said second tape loop; and said first and second driving means include means connected to said third sensing means for controlling said third tape loop.

4. An information recording tape transport as claimed in claim 2, wherein:

said first, second and third tension equalizing means include means for maintaining tape tension at said first and second transducer means essentially constant.

5. An information recording tape transport as claimed in claim 1, wherein:

said first, second and third tension equalizing means include means for maintaining tape tension at said first and second transducer means essentially constant.

6. An information recording tape transport as claimed in claim 1, including:

means operatively associated with said first, second and third tension equalizing means for jointly energizing said first, second and third tension equalizing means.

7. An information recording tape transport as claimed in claim 6, including:

means operatively associated with said first tension equalizing means and said joint energizing means for isolating the equalizing function of said first tension equalizing means from the equalizing function of said second and third tension equalizing means;

means operatively associated with said second tension equalizing means and said joint energizing means for isolating the equalizing function of said second tension equalizing means from the equalizing function of said first and third tension equalizing means; and means operatively associated with said third tension equalizing means and said joint energizing means for isolating the equalizing function of said third tension equalizing means from the equalizing function of said first and second tension equalizing means.

8. An information recording tape transport comprising in combination:

first winding means for selectively winding and unwinding information recording tape;

second winding means for selectively winding and unwinding information recording tape;

first driving means including a first tape drive capstan for driving information recording tape between said first and second winding means;

second driving means including a second tape drive capstan for driving information recording tape between said first and second winding means;

first transducer means located adjacent said first tape drive capstan for transducing information relative to information recording tape;

second transducer means located adjacent second tape drive capstan for transducing information relative to information recording tape;

a first tape pressure differential column between said first winding means and said first tape drive capstan;

a second tape pressure differential column between said second winding means and said second tape drive capstan;

a third tape pressure differential column between said first and second tape drive capstans; and means for controlling the lengths or recording tape in said first, second and third tape differential columns.

9. An information recording tape transport as claimed in claim 8, wherein:

said means for controlling said lengths of recording tape include:

first sensing means for sensing the length of recording tape in said first column;

second sensing means for sensing the length of recording tape in said second column;

third sensing means for sensing the length of recording tape in said third column;

said first winding means include means connected to said first sensing means for controlling the length of recording tape in said first column;

said second winding means include means connected to said second sensing means for controlling the length of recording tape in said second column; and said first and second driving means include means connected to said third sensing means for controlling the length of recording tape in said third column.

10. An information recording tape transport as claimed in claim 9, wherein:

said first transducer means include recording transducer means;

said second transducer means include reproduce transducer means;

said first driving means include means selectively connectible to said third sensing means for controlling the length of recording tape in said third column during a reproduce mode; and said second driving means include means selectively connectible to said third sensing means for controlling the length of recording tape in said third column during a recording mode.

11. An information recording tape transport as claimed in claim 8, including:

means connected to said first, second and third columns for jointly moving a gas relative to said first, second and third columns.

12. An information recording tape transport as claimed in claim 11, including:

first equalizing means operatively associated with said first column and said joint gas moving means for equalizing the pressure differential in said first column essentially independently of the pressure differentials in said second and third columns;

second equalizing means operatively associated with said second column and said joint gas moving means for equalizing the pressure differential in said second column essentially independently of the pressure differentials in said first and third columns; and third equalizing means operatively associated with said third column and said joint gas moving means for equalizing the pressure differential in said third column essentially independently of the pressure differentials in said first and second columns.

13. An information recording tape transport as claimed in claim 12, wherein:

said first equalizing means include first restricted cross-section duct means connected between said first column and said joint gas moving means;

said second equalizing means include second restricted cross-section duct means connected between said second column and said joint gas moving means; and said third equalizing means include third restricted cross-section duct means connected between said third column and said joint gas moving means.

14. An information recording tape transport as claimed in claim 13, wherein:

said first equalizing means include first valve means for selectively admitting a gas toward said first column;

said second equalizing means include second valve means for selectively admitting a gas toward said second column; and said third equalizing means include third valve means for selectively admitting a gas toward said third column.

15. An information recording tape transport comprising in combination:

first winding means for selectively winding and unwinding information recording tape;

second winding means spaced from said first winding means for selectively winding and unwinding information recording tape;

first driving means including a first tape drive capstan for driving information recording tape between said first and second winding means;

second driving means distinct from said first driving means and including a second tape drive capstan for driving information recording tape between said first and second winding means;

first transducer means located adjacent said first tape drive capstan for transducing information relative to information recording tape;

second transducer means located adjacent said second tape drive capstan for transducing information relative to information recording tape; and means for applying recording tape to said first and second transducer means at controlled tension, comprising:

first means for equalizing tension of information recording tape between said first winding means and said first driving means;

second means for equalizing tension of information recording tape between said second winding means and said second driving means;

third means for equalizing tension of information recording tape between said first and second driving means;

means operatively associated with said first, second and third tension equalizing means for jointly energizing said first, second and third tension equalizing means;

first isolating means operatively associated with said first tension equalizing means and said joint energizing means for isolating the equalizing function of said first tension equalizing means from the equalizing function of said second and third tension equalizing means;

second isolating means operatively associated with said second tension equalizing means and said joint energizing means for isolating the equalizing function of said second tension equalizing means from the equalizing function of said first and third tension equalizing means; and third isolating means operatively associated with said third tension equalizing means and said joint energizing means for isolating the equalizing function of said third tension equalizing means from the equalizing function of said first and second equalizing means.

16. An information recording tape transport as claimed in claim 15, wherein:

said first tension equalizing means include a first tape pressure differential column;

said second tension equalizing means include a second tape pressure differential column;

said third tension equalizing means include a third tape pressure differential column;

said joint energizing means include means for jointly moving a gas relative to said first, second and third tape pressure differential columns; and said first isolating means include first restricted cross-section duct means connected between said first column and said joint gas moving means;

said second isolating means include second restricted cross-section duct means connected between said second column and said joint gas moving means; and said third isolating means include third restricted cross-section duct means connected between said third column and said joint gas moving means.

17. An information recording tape transport as claimed in claim 16, wherein:

said first equalizing means include first valve means for selectively admitting a gas toward said first column;

said second equalizing means include second valve means for selectively admitting a gas toward said second column; and said third equalizing means include third valve means for selectively admitting a gas toward said third column.

18. An information recording tape transport comprising in combination:

first winding means for receiving a tape reel for selectively winding and unwinding information recording tape onto and from said tape reel;

second winding means spaced from said first winding means for receiving a tape reel for selectively winding and unwinding information recording tape onto and from said tape reel;

first drive means including a first tape drive capstan for driving information recording tape between said first and second winding means;

second driving means distinct from said first driving means and including a second tape drive capstan for driving information recording tape between said first and second winding means;

first transducer means located adjacent said first tape drive capstan for transducing information relative to information recording tape;

second transducer means located adjacent said second tape drive capstan for transducing information relative to information recording tape; and means for applying recording tape to said first and second transducer means at controlled tension, comprising:

first tension equalizing means between said first winding means and said first tape drive capstan;

second tension equalizing means between said second winding means and said second tape drive capstan; and third tension equalizing means between said first and second tape drive capstans.

19. An information recording tape transport as claimed in claim 18 wherein:

said first tension equalizing means include means for controlling said first winding means;

said second tension equalizing means include means for controlling said second winding means; and said third tension equalizing means include means for controlling either of said first and second driving means.

20. An information recording tape transport as claimed in claim 18, wherein:

said first tension equalizing means include means for forming a first tape loop and first sensing means for sensing a predetermined quality of said first tape loop;

said second tension equalizing means include means for forming a second tape loop and second sensing means for sensing a predetermined quality of said second tape loop;

said third tension equalizing means include means for forming a third tape loop and third sensing means for sensing a predetermined quality of said third tape loop;

said first winding means include means connected to said first sensing means for controlling said first tape loop;

said second winding means include means connected to said second sensing means for controlling said second tape loop; and said first and second driving means include means connected to said third sensing means for controlling said third tape loop.

21. An information recording tape transport as claimed in claim 19, wherein:

said first, second and third tension equalizing means include means for maintaining tape tension at said first and second transducer means essentially constant.

22. An information recording tape transport as claimed in claim 18, wherein:

said first, second and third tension equalizing means include means for maintaining tape tension at said first and second transducer means essentially constant.

23. An information recording tape transport as claimed in claim 18, including:

means operatively associated with said first, second and third tension equalizing means for jointly energizing said first, second and third tension equalizing means.

24. An information recording tape transport as claimed in claim 23, including:

means operatively associated with said first tension equalizing means and said joint energizing means for isolating the equalizing function of said first tension equalizing means from the equalizing function of said second and third tension equalizing means;

means operatively associated with said second tension equalizing means and said joint energizing means for isolating the equalizing function of said second tension equalizing means from the equalizing function of said first and third tension equalizing means; and means operatively associated with said third tension equalizing means and said joint energizing means for isolating the equalizing function of said third tension equalizing means from the equalizing function of said first and second tension equalizing means.

* * * * *